F. EVANS & T. DYSON.
Apparatus for Preparing Chocolate and Cocoa.
No. 153,325. Patented July 21, 1874.
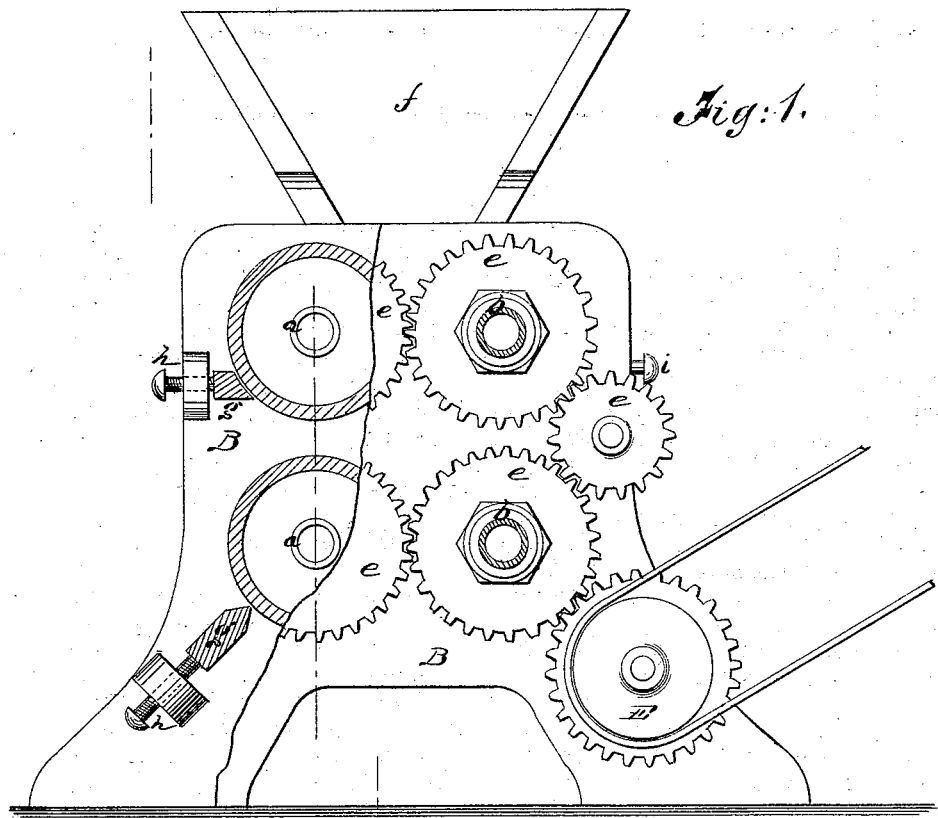
Fig: 1.
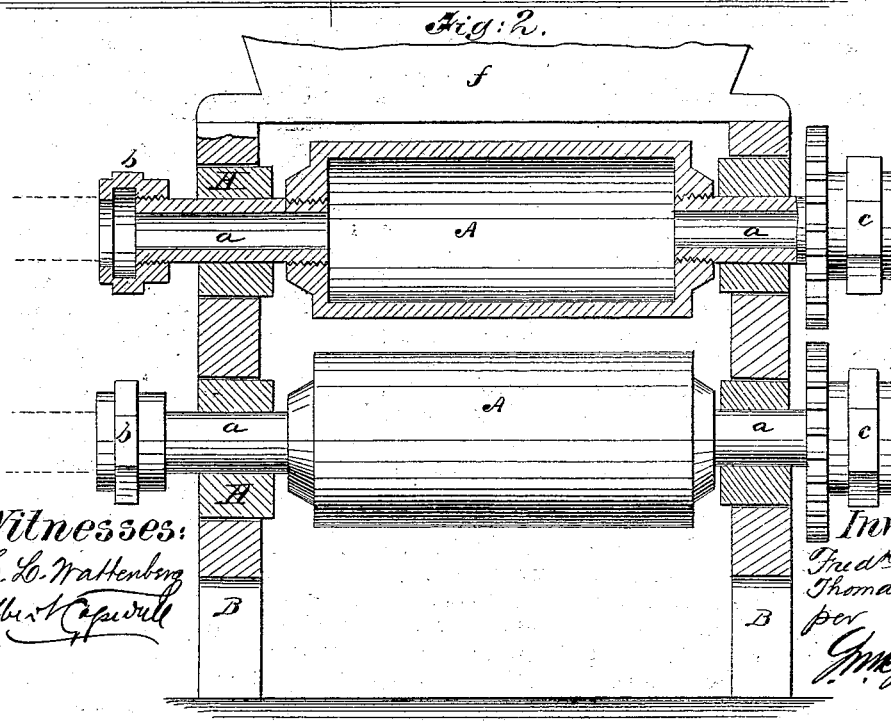
Fig: 2.
Witnesses: Inventors:
H. L. Wattenberg Fred'k Evans and
Albert Capwell Thomas Dyson
per

UNITED STATES PATENT OFFICE.

FREDERICK EVANS AND THOMAS DYSON, OF NEW YORK, N. Y.

IMPROVEMENT IN APPARATUS FOR PREPARING CHOCOLATE AND COCOA.

Specification forming part of Letters Patent No. 153,325, dated July 21, 1874; application filed June 30, 1874.

*To all whom it may concern:*

Be it known that we, FREDERICK EVANS and THOMAS DYSON, of the city, county, and State of New York, have invented a new and useful Improvement in Rolls for Preparing Chocolate and Cocoa; and that the following is a full, clear, and exact description of the same, reference being had to the accompanying drawings, and to the letters of reference marked thereon, making a part of this specification.

This invention is in the nature of an improvement in rolls for preparing chocolate and cocoa; and the invention consists in a series of hollow rolls or drums, arranged and constructed so that a continuous current of cold water or steam may pass through them, in the manner and for the purpose hereinafter fully described.

In the accompanying sheet of drawings, Figure 1 represents an end view of our rolls, partly in section; and Fig. 2, a side view of same, partly in section.

Similar letters of reference indicate like parts in the several figures.

As is well known, in the preparation of the cocoa-bean for the purpose of rendering it marketable as cocoa or chocolate, expensive and complicated machinery has heretofore been employed for this purpose; and in addition to this machinery, it has always been found necessary to subject the cocoa to repeated grinding, mixing, scraping, and melting, in separate operations, before it was rendered in a marketable condition as cocoa and chocolate. By our invention, however, this process is simplified and the cocoa-beans prepared as cocoa or chocolate without the use of expensive machinery or the loss of time in its preparation.

A series or train of rolls, A, are constructed with hollow interiors, and are provided with hollow journals, $a$, and the necessary couplings, $b$. These rolls are supported in suitable bearing-frames, B, and they are placed in pairs, one above another. To the end of each roll are secured gear-wheels $e$, that mesh into one another, and into the gears of a driving-wheel, E. Immediately over the surface of the upper rolls is provided a hopper, $f$, and between the rolls A, and also below the under rolls, are affixed scrapers $g$. These scrapers are adjustable by set-screws $h$, and the rolls themselves are rendered adjustable by means of the adjustable bearings H, which, by the operation of the set-screws $i$, permit the rolls to be moved nearer to or farther from each other.

Our rolls being constructed substantially as above described, they are operated as follows: Power being applied to the driving-wheel E, the rolls are caused to revolve, and if it is designed to prepare the cocoa-bean for merchantable cocoa, suitable pipes are attached to the couplings $b$ and a current of cold water directed into the several rolls, filling them and finding exit through the couplings $c$ at the other end of the rolls, keeping the rolls at all times thoroughly cooled. The cocoa-beans, having been roasted in the ordinary way and deprived of their shells, are cracked and introduced into the hopper $f$, whence they come in contact with the upper pair of rolls, A, and being crushed and ground between them, they pass to the second pair of rolls, (which may be brought closer together than the upper pair of rolls,) and in this way the cocoa is reduced until it emerges from beneath the rolls in a fine, granulated state, and it is at once ready for market and for use. If the rolls were not kept cool by the current of cold water through them, the friction created by the passage of the cocoa-beans between the rolls would heat them to such an extent as to partially liquefy or soften the oleaginous principle in the bean, and the cocoa would mass together in a stiff and almost unyielding substance, rendering it difficult to pass between the rolls and destroying its granulated form.

When the rolls above described are to be used for the manufacture of chocolate, live steam, instead of a current of water, is passed into the rolls A in precisely the same manner as was conducted the water above mentioned, and by this means the rolls are heated to the temperature of the steam, so that when the cocoa-beans pass between them the heated rolls at once liquefy the oleaginous principle contained in the cocoa, and the heat, together with the pressure of the rolls, at once melts, as it were, or dissolves the cocoa into a homogeneous, ungranulated, and smooth mass, so that when it finally issues below the rolls it is in the form of an unctuous paste, and is at once, and without further preparation, ready for the market. If sweet chocolate is desired, sugar or other saccharine substance may be added to the chocolate, either as it passes through the rolls or afterward. To prevent the rollers becoming choked or clogged when in operation, scrapers $g$, which are adjustable, as before mentioned, are secured to the frame B of the rolls, and these remove any surplus cocoa that may adhere to the surface of the rolls.

Having thus described our invention, what we claim as new, and desire to secure by Letters Patent, is—

Rolls for the manufacture of cocoa or chocolate, constructed with hollow interiors, in combination with steam or water pipes, substantially in the manner and for the purpose described.

FREDERICK EVANS.
THOMAS DYSON.

Witnesses:
   H. L. WATTENBERG,
   G. M. PLYMPTON.